United States Patent

Kurokami et al.

[11] Patent Number: 5,905,718
[45] Date of Patent: May 18, 1999

[54] COMMUNICATION SYSTEM FOR MULTICASTING DELAY-ADJUSTED SIGNALS ON SAME RADIO FREQUENCIES TO ADJOINING CELLS

[75] Inventors: Yuzo Kurokami; Makoto Anzai, both of Tokyo, Japan

[73] Assignee: NEC Corporation, Tokyo, Japan

[21] Appl. No.: 08/816,526

[22] Filed: Mar. 13, 1997

[30] Foreign Application Priority Data

Mar. 14, 1996 [JP] Japan ................................. 8-057837

[51] Int. Cl.$^6$ ................................................. H04Q 7/00
[52] U.S. Cl. ........................... 370/328; 370/517; 370/519
[58] Field of Search .................................. 370/328, 286, 370/516, 517, 519, 290, 291, 503, 337, 507, 508; 375/356; 455/502, 503

[56] References Cited

U.S. PATENT DOCUMENTS

| | | | |
|---|---|---|---|
| 4,301,539 | 11/1981 | Kage ........................................ | 375/356 |
| 4,696,052 | 9/1987 | Breeden ................................... | 455/503 |
| 4,718,108 | 1/1988 | Davidson et al. ....................... | 455/503 |
| 5,088,108 | 2/1992 | Uddenfeldt et al. .................... | 375/230 |
| 5,241,545 | 8/1993 | Kazecki et al. ......................... | 370/337 |
| 5,297,169 | 3/1994 | Backstrom et al. ..................... | 375/231 |
| 5,361,398 | 11/1994 | Christian et al. ........................ | 375/356 |
| 5,398,129 | 3/1995 | Reimann .................................. | 370/517 |
| 5,506,837 | 4/1996 | Sollner et al. ........................... | 370/336 |
| 5,506,867 | 4/1996 | Kotzin et al. ............................ | 375/356 |
| 5,559,808 | 9/1996 | Kostreski et al. ....................... | 370/517 |
| 5,561,701 | 10/1996 | Ichikawa ................................. | 455/502 |
| 5,570,372 | 10/1996 | Shaffer .................................... | 370/517 |
| 5,598,413 | 1/1997 | Sansom et al. .......................... | 370/516 |
| 5,610,911 | 3/1997 | Ishikawa et al. ........................ | 370/503 |
| 5,654,960 | 8/1997 | Kohlschmidt ........................... | 370/519 |

FOREIGN PATENT DOCUMENTS

6-237195    8/1994    Japan .

*Primary Examiner*—Dang Ton
*Assistant Examiner*—Phirin Sam
*Attorney, Agent, or Firm*—Whitham, Curtis & Whitham

[57] ABSTRACT

In a cellular radio communication system, a downlink signal is multicast from a cental station and multiple base stations receive the multicast downlink signal via transmission links and respectively transmit the downlink signal on radio waves of same frequencies so that a cluster of adjoining areas is illuminated with the radio waves. A mobile station having a tapped-delay line equalizer receives signals from the base stations via multipath fading channels and equalizes the received signals. Interference between the transmitted signals is avoided by adjusting the relative propagation delay times of the transmission links so that the signals received by the mobile station occur within the tapped-delay line length of the equalizer.

9 Claims, 2 Drawing Sheets

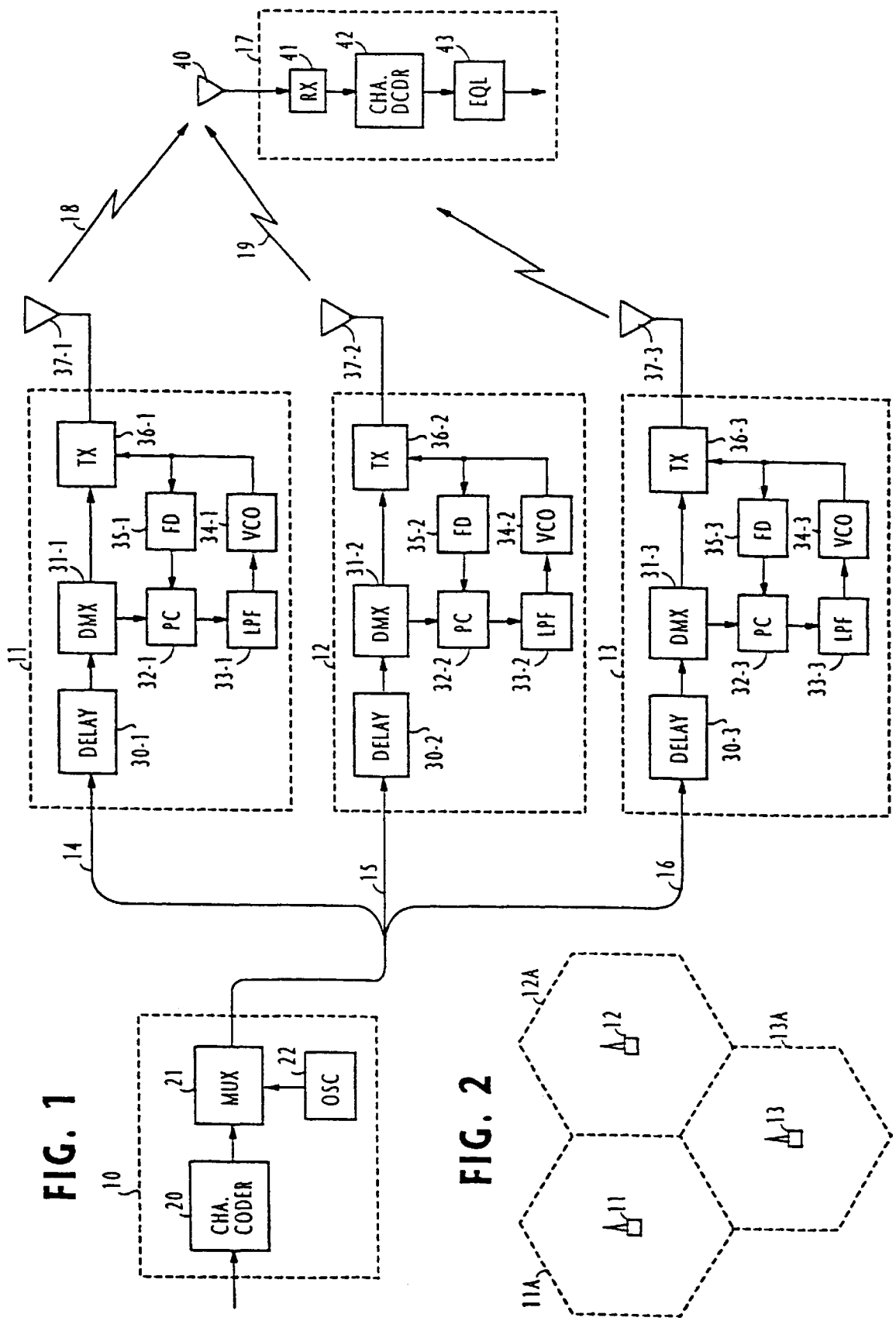

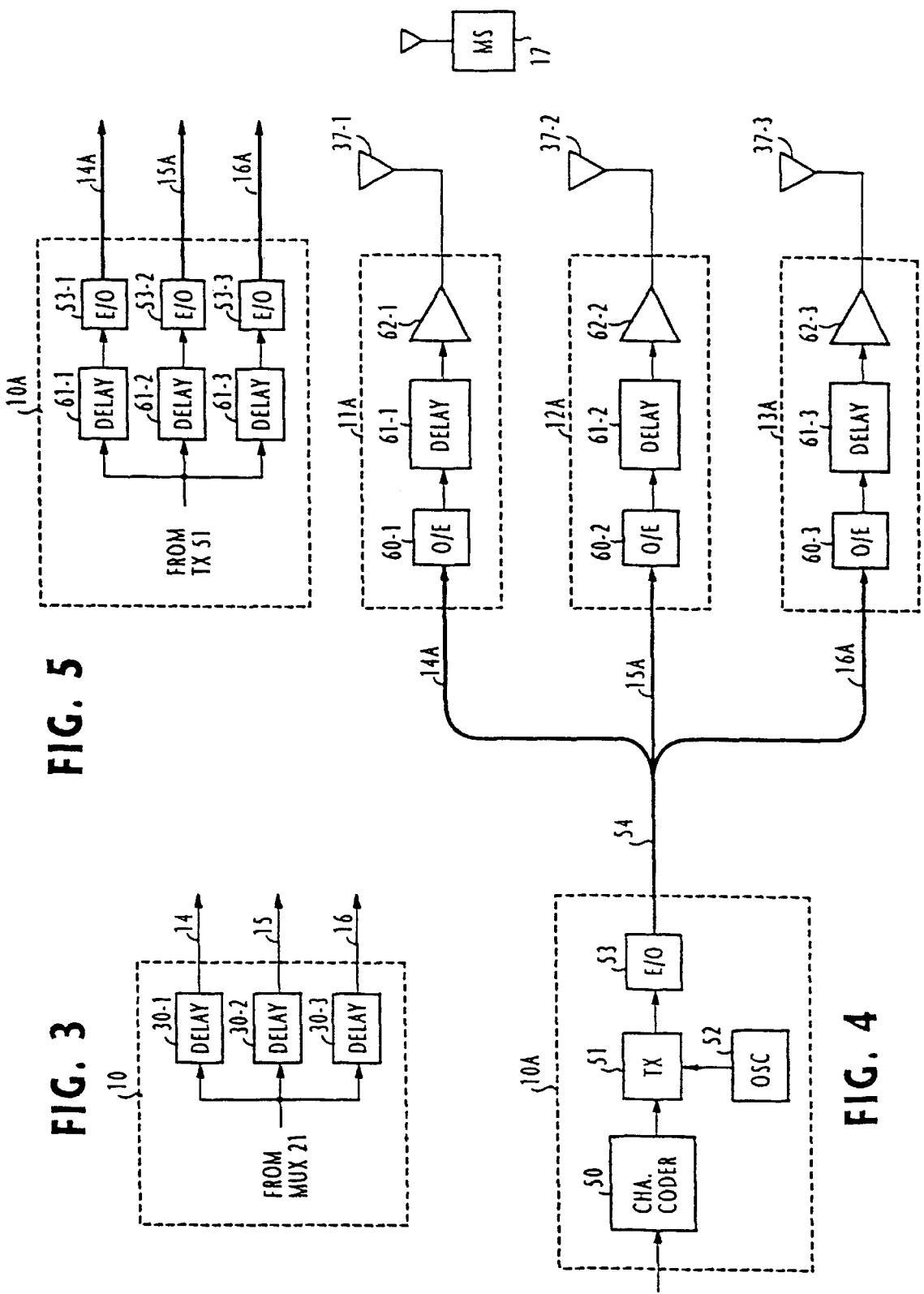

COMMUNICATION SYSTEM FOR MULTICASTING DELAY-ADJUSTED SIGNALS ON SAME RADIO FREQUENCIES TO ADJOINING CELLS

BACKGROUND OF THE INVENTION

1. Field of the Invention

The present invention relates generally to cellular radio communication systems, and more specifically to a technique for expanding the coverage by multicasting a downlink signal to a plurality of base stations.

2. Description of the Related Art

In a cellular radio communication system, the usual method of covering a large cell is to provide high power transmission from a high-tower antenna. However, the installation of such high-power base stations may not necessarily represent the best solution in remote fringe areas where the coverage does not fit their geographic contour. In addition, the transmission power of a base station must be limited so that the power of reception at users near the base station is not too strong. As an alternative, a plurality of base stations simply designed to serve as low-power relay stations are respectively installed in separate areas and a downlink signal from a central station is multicast on a single radio frequency from the base stations simultaneously. However, the transmission power levels of the base stations and their locations must be such that there are dead spots around each cell to avoid interference between the multicast signals. Although advantageous from the frequency savings point of view, the prior art solution is not appropriate for areas where traffic demand is high and cells must be clustered, allowing no dead spots.

SUMMARY OF THE INVENTION

It is therefore an object of the present invention to provide a cellular radio communication system which allows multicasting of a signal over a plurality of adjoining cells using the same radio frequency.

According to the present invention, there is provided a cellular radio communication system comprising a central station for multicasting a downlink signal, a plurality of base stations for receiving the multicast downlink signal via transmission links and respectively transmitting the downlink signal on radio waves of same frequencies so that a plurality of adjoining areas are illuminated with the radio waves, and a mobile station including a tapped-delay line equalizer for receiving signals from the base stations via multipath fading channels and equalizing the received signals. For proper operation of the equalizer, delay adjusting means are provided for adjusting the relative propagation delay times of the transmission links so that the signals received by the mobile station occur within the tapped-delay line length of the equalizer.

According to one specific aspect of this invention, the central station comprises a multiplexer for multiplexing the downlink signal with a pilot signal and transmitting the multiplexed signal to the transmission links, and each of the base stations comprises a demultiplexer for demultiplexing the signal from the corresponding transmission link into the downlink signal and the pilot signal, a phase-locked loop including a voltage-controlled oscillator for producing a radio frequency carrier, a frequency divider for dividing the frequency of the carrier, a phase comparator for comparing the pilot signal from the demultiplexer and the output of the frequency divider, and a lowpass filter for filtering the output of the phase comparator to produce a control signal for the voltage-controlled oscillator, and a transmitter for modulating the downlink signal from the demultiplexer onto the radio frequency carrier from the voltage-controlled oscillator.

According to another specific aspect, the transmission links are optical transmission mediums and the central station comprises a transmitter for modulating the downlink signal onto a radio frequency carrier, and an electrooptical converter for converting the modulated carrier to an optical signal and transmitting the optical signal to the transmission links. Each of the base stations comprises an optoelectrical converter for converting the optical signal from the corresponding transmission link to an electrical signal, and a power amplifier for amplifying the electrical signal for radio transmission.

BRIEF DESCRIPTION OF THE DRAWINGS

The present invention will be described in further detail with reference to the accompanying drawings, in which:

FIG. 1 is a block diagram of a cellular radio communication system according to one embodiment of this invention;

FIG. 2 is a schematic illustration of a cluster of mutually adjoining cells in which the base stations of this invention are respectively located;

FIG. 3 is a block diagram of a modification of FIG. 1 in which the delay circuits are provided in a central station;

FIG. 4 is a block diagram of a cellular radio communication system according to a further modification of this invention; and FIG. 5 is a block diagram of a modification of FIG. 4 in which the delay circuits are provided in the central station.

DETAILED DESCRIPTION

Referring now to FIG. 1, there is shown a cellular radio communication system according to one embodiment of the present invention. In the system, a central station 10 and a plurality of remote base stations 11, 12 and 13 connected to the central station via coaxial cables 14, 15, 16, respectively, to cover a cluster of mutually adjoining cells 11A, 12A and 13A (FIG. 2). At the central station, a downlink information signal is converted to a coded signal by a channel coder 20 to permit error correction of the signal at the receive site. The output of channel coder 20 is fed to a multiplexer 21 where it is multiplexed with a pilot signal from an oscillator 22. The multiplexed signal is transmitted from the central station to remote base stations 11, 12, 13 via the respective transmission links.

At base station 11, the multiplexed signal is applied through a variable delay circuit 30-1 to a demultiplexer 31-1 where the signal is demultiplexed into the coded information signal and the pilot signal. The pilot signal from the demultiplexer 31-1 is supplied to a phase comparator 32-1 for phase comparison with the output of a frequency divider 35-1. The high frequency component of the output of phase comparator 32-1 is removed by a lowpass filter 33-1. The filtered signal is used to drive a voltage-controlled oscillator 34-1 to produce a radio frequency carrier. The frequency divider 35-1 divides the carrier frequency so that its output is equal to the frequency of the pilot signal. The carrier frequency is therefore maintained constant when the frequency divider output is phase locked to the pilot signal by the closed-loop feedback operation. The coded signal from the demultiplexer 31-1 is modulated in a transmitter 36-1 onto the radio frequency carrier from the VCO 34-1 and power-amplified and applied to an antenna 37-1 for transmission.

Similar processes proceed in base stations 12 and 13. At each of these base stations, the multiplexed input signal is passed through variable delay circuit 30-2 (30-3) and separated into the coded information signal and the pilot signal by demultiplexer 31-2 (31-3) and the coded signal is modulated onto a radio frequency carrier produced by VCO 34-2 (34-3) and transmitted from antenna 37-2 (37-3). The carrier frequency is maintained constant by phase-locking the output of frequency divider 35-2 (35-3) to the pilot signal through phase-locked loop. Therefore, the downlink signal is transmitted from all the base stations on carriers of the same frequency.

Within a cluster of cells 11A, 12A, 13A, a mobile subscriber station 17 receives signals from one or more of these cell sites. Subscriber station 17 includes a receiver 41 that feeds the baseband component of the signal detected at antenna 40 to a channel decoder 42 where the original information signal is detected from the coded signal. The output of channel decoder 42 is supplied to an equalizer 43. If the subscriber station 17 is close to one of the base stations, the strength of the received signal is so strong that no interference from the other base stations exists. If the subscriber station 17 is at or near the boundary between adjoining cells, receiving signals from antennas 37-1 and 37-2, for example, via transmission paths 18 and 19 as illustrated in FIG. 1, these signals are of substantially equal intensity and interference results. However, one of these signals is canceled by the equalizer 43 since the transmission paths 18 and 19 can be treated as multipath fading channels.

One example of equalization is by the use of a decision feedback equalizer formed by tapped delay-line filters, or transversal filters. For proper operation of the equalizer, the maximum time difference between any of the multipath fading channels must be smaller than the delay-line length of the equalizer. This is achieved by adjusting variable delay circuits 30-1, 30-2 and 30-3 to reduce the differences between the propagation delays, or lengths of coaxial cables 14, 15 and 16 from the central station 10.

For full-duplex operation, uplink paths must be provided in the system. However, since interference occurs only between downlink signals at the subscriber station, the uplink paths of the system are omitted for simplicity.

For ease of adjustment of the delay circuits 30-1 to 30-3, these delay circuits are preferably provided in the central station 10 as shown in FIG. 3 between the output of multiplexer 21 and the respective transmission links 14, 15, 16.

The transmission links may be optical links. FIG. 4 shows a modified embodiment of this invention using optical fibers 14A, 15A, 16A for connecting the central station 10A to base stations 11A, 12A and 13A. To take advantage of the broad bandwidth of optical links, the central station includes a transmitter 51 that modulates the output of channel coder 50 onto a radio frequency carrier from oscillator 52. The up-converted signal from transmitter 51 is fed to an electro-optical converter 53 where it is converted to an optical signal and launched into an optical fiber 54 and transmitted through optical links 14A, 15A and 16A to base stations 11A, 12A, 13A. Input optical signals from links 14A, 15A, 16A are converted to electrical signals by opto-electrical converters 60-1, 60-1, 60-2, delayed by respective variable delay circuits 61-1. 61-2, 61-3 and amplified by power amplifiers 62-1, 62-2, 62-3 and fed to antennas 37-1, 47-2 and 37-3 for transmission. In a manner similar to the previous embodiment, variable delay circuits 61-1, 61-2 and 61-3 are adjusted so that the maximum time difference between any of multipath fading channels from antennas 37-1, 37-2, 37-3 to the mobile station 17 is smaller than the delay-line length of the equalizer of the mobile station.

As shown in FIG. 5, delay circuits 61-1 to 61-3 may be provided, for delay adjustment purposes, in the central station 10A between the output of transmitter 51 and a plurality of electrooptical converters 53-1 to 53-3 which are connected to the respective transmission links 14A, 15A, 16A.

What is claimed is:

1. A cellular radio communication system comprising:

a central station for multicasting a downlink signal;

a plurality of base stations for receiving the multicast downlink signal via transmission links and respectively transmitting the downlink signal on radio waves of same frequencies so that a plurality of adjoining areas are illuminated with the radio waves;

a mobile station including a equalization circuit which receives signals from said base stations via multipath fading channels and which equalizes the received signals; and a circuit, in said mobile station, which adjusts relative propagation delay times of said transmission links so that the signals received by the mobile station occur within a delay-line length of said equalization circuit.

2. A cellular radio communication system as claimed in claim 1, wherein said adjusting means comprises a plurality of variable delay means connected between the corresponding transmission links and the demultiplexer of each of said base stations.

3. A cellular radio communication system as claimed in claim 1, wherein said adjusting means comprises a plurality of variable delay means connected between the multiplexer of said central station and said transmission links.

4. A cellular radio communication system as claimed in claim 1, wherein said transmission links comprise electrical transmission mediums.

5. A cellular radio communication system as claimed in claim 1, wherein said tapped delay-line equalizer is formed from one of tapped delay-line filters and transversal filters.

6. A cellular radio communication system as claimed in claim 5, wherein said delay-line length is a tapped delay-line length.

7. A cellular radio communication system comprising:

a central station for multicasting a downlink signal;

a plurality of base stations for receiving the multicast downlink signal via transmission links and respectively transmitting the downlink signal on radio waves of same frequencies so that a plurality of adjoining areas are illuminated with radio waves;

a mobile station including a tapped-delay line equalizer for receiving signals from said base stations via multipath fading channels and equalizing the received signals; and means for adjusting relative propagation delay times of said transmission links so that the signals received by the mobile station occur within the tapped-delay line length of said equalizer;

wherein said transmission links comprise optical transmission mediums and said central station comprises:

a transmitter for modulating the downlink signal onto a radio frequency carrier; and an electrooptical converter for converting the modulated carrier to an optical signal and transmitting the optical signal to said transmission links, wherein each of said base stations comprises:

an electrooptical converter for converting the optical signal from the corresponding transmission link to an electrical signal; and a power amplifier for amplifying the electrical signal for radio transmission.

8. A cellular radio communication system as claimed in claim 7, wherein said adjusting means comprises a plurality of variable delay means each being connected between the optoelectrical converter and said power amplifier of each of said base stations.

9. A cellular radio communication system as claimed in claim 7, wherein said adjusting means comprises a plurality of variable delay means connected to the output of said transmitter, and wherein a plurality of said electrooptical converters are provided for converting the output signals of the variable delay means to a plurality of optical signals and respectively transmitting the optical signals to said transmission links.

* * * * *